Aug. 19, 1958  W. H. STEPHENSON  2,847,922
ROTARY MULCHING AND CULTIVATING DEVICE
Filed June 27, 1955
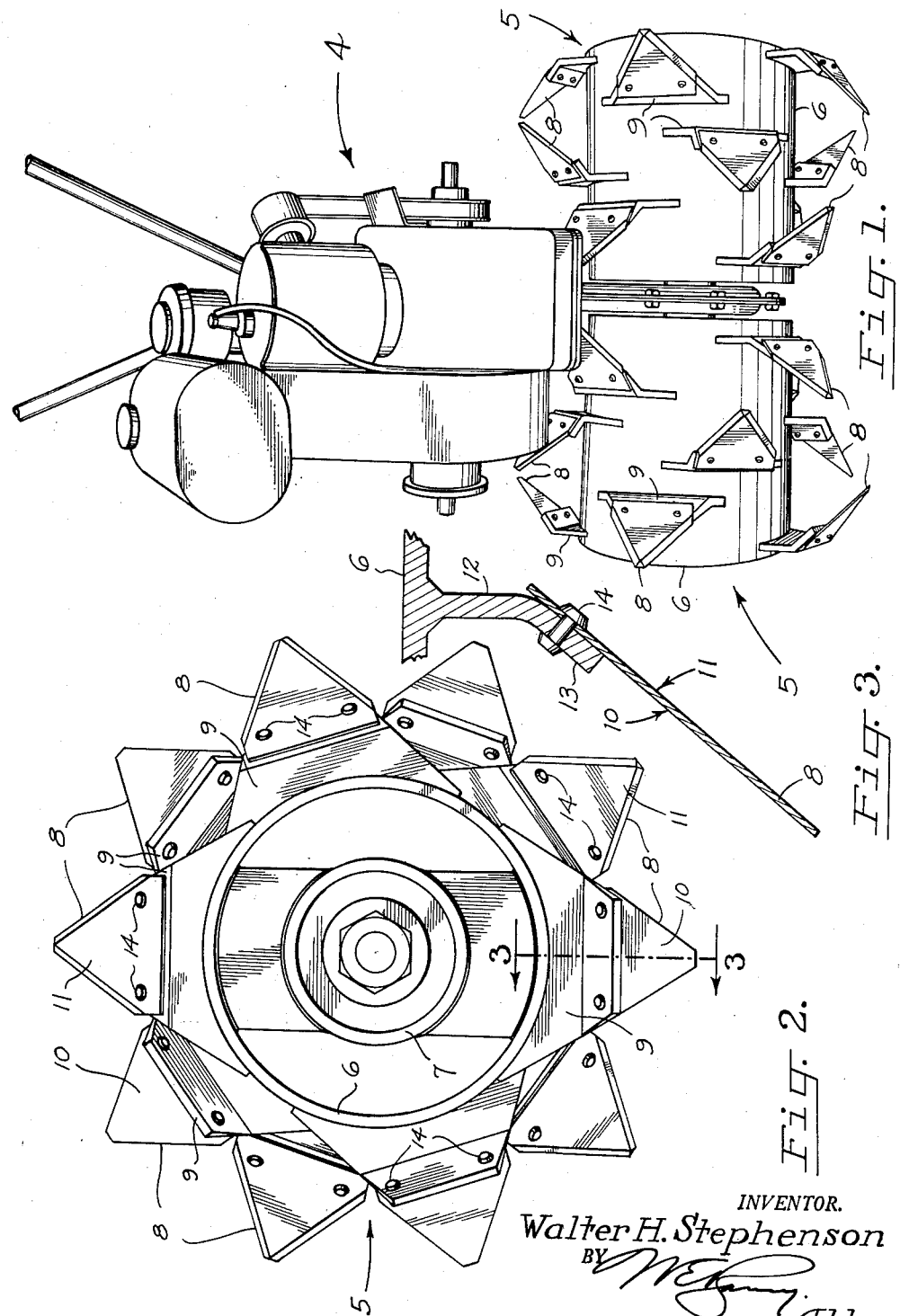
INVENTOR.
Walter H. Stephenson
BY
Atty.

2,847,922

ROTARY MULCHING AND CULTIVATING DEVICE

Walter H. Stephenson, Portland, Oreg.

Application June 27, 1955, Serial No. 518,207

3 Claims. (Cl. 97—215)

This invention relates to a reversible rotary cultivator having a slicing or cutting action in contrast with the more conventional turning or throwing action of a rotary cultivator.

One object of my invention is to provide a rotary cultivator or blade unit for attachment to a rotary tiller, which cultivator requires less power to operate, will rotate at a higher speed, and will not entangle or wrap up with weeds and trash.

Farmers and agriculture experts have known the advantage of rotary cultivation for many years. In their concern with the development of better tools to effect this type of cultivation, however, one large area of farming has been bypassed or forgotten. This area includes cultivation about those trees, berries, and the like having very shallow feeder roots located near the surface of the ground. Filberts, blueberries, and strawberries are illustrative of these crops. For example, a filbert tree has no tap root. Instead, it has a large number of shallow feeder roots which lie quite close to the surface of the ground, sometimes being as close as three inches to the surface. With those rotary cultivators heretofore known, it has been impractical to cultivate these shallow rooted crops, of which filberts are an example, since the cultivator blades reach deeper than three inches and thus sever the feeder roots and destroy the plant. It is a primary object of the instant invention to provide a novel rotary cultivator making practical for the first time the shallow cultivation and the nicety of control essential with those crops of which filberts, blueberries, and strawberries are exemplary.

To the above end, my cultivator includes a large diameter hub member which acts as a float or buoy to limit penetration into the ground. This hub is in the form of a hollow cylindrical tube or pipe mounted for rotation about the axis thereof. A plurality of thin flat blades of limited length are spaced about the outer periphery of this tube and are arranged substantially normal to the direction of rotation of the hub. The radial projection of the blades is limited for shallow cultivation and the penetration of each blade thus is controlled both by the action of the large hollow hub and the configuration of the blade. That is to say, the effective radial projection of each blade beyond the outer periphery of the hub member is no greater than the outer radius of the hub itself. This effectively limits the cultivation to a shallow depth which is no greater than the radius of the hub. The provision of such a structure for limited, controlled, shallow cultivation is one object of my invention.

As noted above, the blades of my cultivator are arranged substantially normal to the direction of rotation of the hub. In addition, each blade is of a triangular configuration with two side margins sharpened to define cutting edges. Accordingly, when the hub is rotated, the blades slice or cut through the cover crop and soil in contrast with the more conventional throwing or overturning action of a hooked blade. In practical result, the blades of my cultivator thus will not catch, accumulate, entangle, or wrap with weeds, trash, vines, and the like as have most prior blades with which I am aware. In those areas where the grass or weeds have grown head high or heavy sod covers the ground, my cultivator will stay clean and will function with efficiency to slice, chop and mulch without entangling or wrapping up with trash. The provision of structure allowing this result is another object of my invention.

In detail, each blade of my cultivator is mounted upon a separate base plate which is fixed to the periphery of the hub. Each side margin of the base and blade member lies substantially on a tangent to the outer periphery of the hub. This tangential disposition further aids the slicing action above described when the hub is rotated during use. In combination, each blade is formed with a flat back face and a bevel edged front face. This generates a self-sharpening action as the blade is worked and further prevents entanglement or wrapping with weeds, trash, vines, or the like. The provision of this particular configuration in a cultivator blade is another object of my invention.

A further object of my invention is to provide a novel blade for a cultivator, which blade is triangular in configuration and is formed of high carbon steel. Such a blade may be likened to the conventional triangular sickle blades, available as standard items of commerce for mowers. Thus, when need be, such mower blades can be utilized with my cultivator thus reducing the overall cost of blade replacement and providing a blade which is available over a wide area at an inexpensive cost.

Yet another object of my invention is to attach the blades of a cultivator to an angular base member with two spaced rivets or the like such that a sharp blow upon the end of the blade will shear the rivets. This allows a quick, easy replacement of a blade when such is necessary.

Still another object of my invention is to provide a pair of allochiral interchangeable rotary cultivators adapted to be mounted one on each side of a tiller. These cultivators have symmetrical blades with two sharp edges such that one cultivator can be interchanged with the other thereby reversing the direction of rotation and producing a uniform wear.

Yet another object of my invention is to provide a shallow depth cultivator with a large diameter hub which will tend to buoy up the cultivator and keep it from sinking into soft spots, in combination with blades of limited reach particularly adapted for shallow cultivation.

A further object of my invention is to provide a cultivator with blades and base members both of which are flat sections and both of which are arranged substantially normal to the direction of rotation of a hub in order to effect a slicing action through the soil with a minimal amount of resistance. In effect, this allows the cultivator to be operated at greater rotational and ground speeds and with less power thereby producing a finer mulch and allowing operation in very thick cover crops.

These and other objects and advantages of my invention will become apparent during consideration of the following detailed description, taken in conjunction with the accompanying drawings, wherein:

Fig. 1 is a front view of a rotary tiller having a pair of my rotary cultivators secured thereto;

Fig. 2 is an end view of a single cultivator showing the angular position of the blades relative to one another; and Fig. 3 is a section view, taken substantially on the line 3—3 of Fig. 2, showing the manner of attachment of a blade to a base and showing the oblique disposition of the blade to the radial line of the hub.

The cultivators of the instant invention are adapted for use with any standard rotary tiller of the garden or field type and, to this end, I have shown at 4 a somewhat stylized view intended to represent any of various tillers. In function, the cultivators 5 are adapted for rapid, shallow slicing and cutting of the vegetation or cover crop which overlies orchards, berry fields and other areas with crops having shallow feeder roots. To this end, the cultivators are allochiral and interchangeable end for end one with another, each having a main structural element which consists of an elongated large diameter hub member 6. These hubs are in the form of hollow cylindrical pipes or tubes rotatable about the axes thereof and equipped with internal spokes and splines or the like, identified at 7, for attaching the hubs to the drive mechanism of the rotary tiller 4.

The blades 8 of the cultivators are attached to the outer periphery of the hubs by means of base plates 9. Thus, each base serves to space its companion blade radially out from the surface of the hub. In function, this spacing allows the depth of cultivation to be controlled in correlation with the buoyancy of the large hollow hub.

Referring in particular to Fig. 2, it will be seen that each blade 8 is of a flat triangular configuration and is symmetrical about a centerline through the blunt tip. Further, each blade is provided with a flat back face 10 and a bevel edged front face 11. I have found that a blade of substantially this configuration is available with a steel having a high carbon content as a sickle or mower blade and on sale as a standard item of commerce. Where necessary, this allows the purchase of mower blades in large quantity at low cost, modification of the blade being kept to a minimum to provide a blade particularly adapted for shallow cultivation.

In conjunction with the bevel edged front face 11, it will be noted that the two side margins of the bevel are sharp to a knife edge thus defining cutting edges. Further, this symmetrical configuration is one factor allowing the two hubs 5 to be interchanged one for another end for end to reverse the direction of rotation. That is to say, when a given hub is rotated in a particular direction, but one of the sharp bevel edges cuts and slices through the ground. When the hubs are interchanged, the opposite edges of all the blades are utilized, thus equalizing the wear over the life of the cultivator.

Each base plate 9 is formed with an arcuate lower margin so as to fit closely to the periphery of the hub. I prefer to weld or otherwise fix each such base firmly to the hub so as to prevent inadvertent loss. In addition, as shown in Fig. 3, each base plate has a flat hub attachment portion 12 which extends radially out from the hub. A flat blade carrying outer portion 13 is arranged at an oblique angle to the radius of the hub portion across a bend which joins the two portions 12 and 13 one to another. The blade 8 then is made to overlie or overlap the outer portion 13 and is riveted thereto as indicated at 14. Thus, should one of the blades break or otherwise require replacement, the rivets 14 easily are sheared by effecting a sharp blow, as with a hammer, on the outer blunt point of the defective or broken blade. After this shearing action is accomplished, a new blade can be attached with conventional riveting tools usually available to farmers. Still further, because the blades themselves are substantially the same as mower or sickle blades, replacements easily are obtained. The wide distribution of such sickle blades throughout the country means the farmer need not delay replacement of a worn or broken cultivator blade.

Referring more particularly to Fig. 2, it will be seen that each side margin of each base and blade member lies substantially on a tangent to the outer periphery of the hub 6. This tangential configuration combines with the sharpened edges of the blade and with the disposition of both the base and the blade normal to the direction of rotation of the hub to effect the desired slicing action as the blades enter the soil. Thus, as the hub is rotated, the blades and bases slice through the soil with a minimum chance of throwing clods or disturbing shallow roots. Further, these same factors in combination prevent the accumulation and wrapping about or entangling of weeds, trash, vines, and the like when the cultivator is worked. They also allow the cultivator to be worked with a minimum of power and cause the sharpened edges of the blade to enter the ground with a slicing action which tends to maintain the sharpness of the margins. That is to say, the back face of each blade 10 is flat whereas the front face 11 is beveled at the margins. As the blade is forced on edge through the soil, the flow of the soil over the bevel edge tends to maintain the sharpness of that edge and thus to effect a self-sharpening action. This assures the continued efficient cutting of the cover crop and the continued freedom from entanglement with trash during the life of the cultivator.

In Fig. 1, it will be seen that approximately half of the blades and bases are curved in one direction longitudinally of the hub whereas the remainder are curved in the opposite direction. As the hub is rotated, this causes the various blades to overlap one another and thus to cultivate throughout the entire length of each hub. Further, because each blade is short and is arranged with this particular overlap disposition, a much greater number of individual blades can be utilized with each hub so as to effect a finer mulching, cutting, and cultivation. In an exemplary structure, I utilize ten or more of the blades 8 spaced around the periphery of a six inch hub with the blades arranged in two intersecting spiral configurations related sinistrorsely and dextrorsely.

In use, my cultivator is particularly adapted for cultivation of crops having shallow roots. To effect this function, it will be noted that the overall radial projection of each blade and base member is limited. That is to say, the effective radial projection of each blade and base member beyond the outer periphery of the hub member 6 is no greater than the radius of the hub itself. With an exemplary six inch hub (six inch diameter) this means that the radial projection will be no greater than three inches. In effect, this limits the cultivation to a shallow depth which can be controlled quite accurately and even to a friction of an inch. A filbert tree, for example, grows with a number of shallow feeder roots located near the surface of the ground. It is essential that cultivation about such filberts be no deeper than three inches and some growers even insist upon a limitation of one-half to one inch of cultivation depth. With the instant invention, such a shallow cultivation is practical and can be controlled with exactitude since the large diameter of the hollow cylindrical hub 6 tends to buoy up the blade structures and the blades themselves are quite short. The cultivator thus is designed for rapid mulching and weeding of orchards and berry fields which require and, in fact, can tolerate only shallow working in order to protect the feeder roots.

In actual use, I have found that my cultivator will destroy nests of field mice, will cut through and mulch heavy cover crops and weeds even head high, and will chop up and mix with the soil all types of trash, debris, weeds, and the like. In effecting this function, the configuration of the blades and the disposition of the plane of each blade and base normal to the direction of rotation of the hub allow the cultivator to rotate quite easily. The tiller thus need exert less power and, with a given horsepower, the tiller can rotate at an increased speed. The thinness of the blades, the right angular disposition of the blades as they rotate through the ground, and the slicing action as the blades enter the ground all add to this function.

It now will be seen that I have served my inventive objects by providing a cultivator particularly adapted to fill the long felt need for a very shallow cultivating instrument capable of exact control. The blades themselves are of a type available as a standard item of commerce and are attached firmly yet with such a structure that they easily and quickly can be replaced. In addition, the slicing and cutting action of the blades combines with the direction in which the sharp edges of the blades enter the ground to assure a clean hub and blade structure even when the cultivator is worked through a heavy cover crop.

I claim:

1. An article of manufacture, comprising an elongated large diameter hub member in the form of a tube rotatable about the axis thereof, a plurality of thin flat triangular blades spaced about the outer periphery of said hub with the plane of each blade arranged obliquely to said axis of rotation of the hub, each said blade having a bevel edged front face, the margins of said bevels being sharp to define self-sharpening cutting edges, each said blade being mounted upon an individual base plate arranged substantially normal to the direction of rotation of the hub, each said base plate having a flat attachment portion extending radially out from said hub and a flat blade carrying outer portion arranged at an oblique angle to the radius of the hub portion across a bend, said blade carrying portions being arranged so the blades overlap one another in the direction of rotation of the hub while the device is worked, and each side margin of each base and blade member lying substantially on a tangent to the outer periphery of said hub so as to effect a slicing action when the hub is rotated.

2. A pair of rotary cultivators, each comprising an elongated large diameter hub member in the form of a hollow cylindrical tube rotatable about the axis thereof, a plurality of thin triangular blades spaced about the outer periphery of each said hub, each said blade being mounted upon an individual base plate fixed to the periphery of said hub and arranged substantially normal to the direction of rotation of the hub, each said base plate having a flat hub attachment portion extending radially out from said hub with an arcuate lower margin fitted to the periphery of the hub and a flat blade carrying outer portion arranged at an oblique angle to the radius of the corresponding hub portion across a bend, said blades being secured flatwise to said outer portions, selected ones of said blade carrying portions extending in opposite directions longitudinally of each hub and being arranged so the blades overlap one another in the direction of rotation of the hubs as the cultivators are worked, each blade being attached with rivets only to a corresponding one of said blade carrying portions to permit ready detachment and replacement of a blade by shearing and replacing the rivets.

3. A pair of allochiral interchangeable rotary cultivators, each comprising an elongated large diameter hub member in the form of a hollow cylindrical tube rotatable about the axis thereof, a plurality of thin triangular blades spaced about the outer periphery of each said hub with the plane of each blade arranged obliquely to said axis of rotation of that hub, each of said blades being symmetrical about a centerline to allow the pair of hubs to be interchanged one for another and end for end to reverse the direction of rotation of the individual blades, each said blade having a flat back face and a bevel edged front face, the margins of said bevels being sharp to define two self-sharpening cutting edges, each said blade being mounted upon an individual base plate fixed to the periphery of said hub and arranged substantially normal to the direction of rotation of the hub, each said base plate having a flat hub attachment portion extending radially out from said hub with an arcuate lower margin fitted to the periphery of the hub and a flat blade carrying outer portion arranged at an oblique angle to the radius of the hub portion across a bend, said blades being secured flatwise to said outer portions, selected ones of said blade carrying portions extending in opposite directions longitudinally of each said hub and being arranged so the blades overlap one another in the direction of rotation of the hubs, each blade overlying and being riveted to a corresponding one of said blade carrying portions to permit ready detachment and replacement of a blade by shearing and replacing the rivets, and the effective radial projection of each blade and base member beyond the outer periphery of the corresponding hub member being no greater than the outer radius of that hub itself to limit cultivation to a shallow depth.

References Cited in the file of this patent

UNITED STATES PATENTS

| 1,681,835 | Bird | Aug. 21, 1928 |
| 2,679,200 | Johnson et al. | May 25, 1954 |

FOREIGN PATENTS

| 532,509 | Great Britain | Jan. 4, 1941 |